(12) United States Patent
Pons (10) Patent No.: US 10,560,020 B2
(45) Date of Patent: Feb. 11, 2020

(54) METHOD OF VOLTAGE DROP COMPENSATION ON A CABLE AND CORRESPONDING CIRCUIT

(71) Applicant: STMicroelectronics (Alps) SAS, Grenoble (FR)

(72) Inventor: Alexandre Pons, Vizille (FR)

(73) Assignee: STMICROELECTRONICS (ALPS) SAS, Grenoble (FR)

( * ) Notice: Subject to any disclaimer, the term of this patent is extended or adjusted under 35 U.S.C. 154(b) by 0 days.

(21) Appl. No.: 16/103,582

(22) Filed: Aug. 14, 2018

(65) Prior Publication Data

US 2019/0074763 A1    Mar. 7, 2019

(30) Foreign Application Priority Data

Sep. 4, 2017  (FR) ..................... 17 58133

(51) Int. Cl.
  *H02M 3/156* (2006.01)
  *G05F 5/00* (2006.01)
  *H02M 1/00* (2006.01)

(52) U.S. Cl.
  CPC ............ *H02M 3/156* (2013.01); *G05F 5/00* (2013.01); *H02M 1/00* (2013.01); *H02M 2001/0022* (2013.01)

(58) Field of Classification Search
  CPC .. H02J 7/04; H02J 7/007; H02J 7/0073; H02J 2007/0062; G05F 1/00; G05F 1/563; G05F 5/00; H02M 2001/0022; H02M 1/00

See application file for complete search history.

(56) References Cited

U.S. PATENT DOCUMENTS

| | | | |
|---|---|---|---|
| 8,138,723 B2 * | 3/2012 | Carkner | H02J 7/0073 320/128 |
| 10,056,775 B2 * | 8/2018 | Toivola | H02J 7/04 |
| 2015/0362944 A1 | 12/2015 | Sporck et al. | |
| 2016/0118880 A1 | 4/2016 | Motoki | |
| 2016/0241068 A1 | 8/2016 | Zhao et al. | |
| 2018/0074574 A1 * | 3/2018 | Camiolo | G05F 1/00 |
| 2019/0074763 A1 | 3/2019 | Pons | |

FOREIGN PATENT DOCUMENTS

| | | |
|---|---|---|
| CN | 103780096 A | 5/2014 |
| CN | 106546822 A | 3/2017 |
| CN | 208673175 U | 3/2019 |

* cited by examiner

*Primary Examiner* — Gary L Laxton
*Assistant Examiner* — Jye-June Lee
(74) *Attorney, Agent, or Firm* — Slater Matsil, LLP (57) ABSTRACT

A method can be used for compensating a voltage drop on a cable connected between a source device and a receiver device. The source device delivers an offset current on a channel configuration pin of the source device, the offset current causing an increase in a voltage on the channel configuration pin of the source device to a chosen reference voltage. The offset current is stored in the source device. The source device absorbs an absorption current originating from the channel configuration pin of the source device, the absorption current depending on the stored offset current and on the voltage drop. The source device generates a compensated supply voltage on a power supply pin of the source device, the compensated supply voltage equal to a reference supply voltage increased by the voltage drop to within a tolerance.

20 Claims, 5 Drawing Sheets

METHOD OF VOLTAGE DROP COMPENSATION ON A CABLE AND CORRESPONDING CIRCUIT

CROSS-REFERENCE TO RELATED APPLICATIONS

This application claims priority to French Patent Application No. 1758133, filed on Sep. 4, 2017, which application is hereby incorporated herein by reference.

TECHNICAL FIELD

Embodiments relate to a method of voltage drop compensation on a cable and a corresponding circuit.

BACKGROUND

A USB Type-C cable is generally designed to be coupled and establish a power supply and communication line between what is termed a USB Type-C 'source' device and what is termed a USB Type-C 'receiver' device.

In theory, USB Type-C devices make it possible to achieve a bit rate of up to 10 Gb/s and to deliver, via power supply pins commonly known to those skilled in the art under the acronym 'VBUS', a power of up to 100 W with a maximum voltage of 20 V and a maximum current of 5 A.

Such a high electrical current of 5 A present in the USB Type-C cables generally leads to a large voltage drop. As a result, the effective voltage received on a VBUS pin of a USB Type-C receiver device is reduced.

In some cases, for example when using a long, low-quality USB Type-C cable, this reduced effective voltage may even be situated outside of the acceptable range as defined in the USB 3.1 Type-C standard.

Conventional controllers implemented in USB Type-C source devices are configured to detect voltage drops on coupled cables and to readjust reference voltages delivered on VBUS pins, so as to compensate these voltage drops.

However, this generally requires a complex implementation on silicon for such a conventional controller, as an analog-to-digital converter (ADC) and a dedicated finite state machine (FSM) are often required to recalculate these reference voltages delivered on the VBUS pins, thereby increasing the area taken up on silicon as a result.

In addition, such a controller implemented in the USB Type-C source device is configured to operate continuously. That being the case, even if no current is supplied by the cable, this controller, in particular the circuit dedicated to compensating the voltage drop on a connected cable, is always operational.

As a result, the conventional controller is not efficient in terms of performance or power consumption, in particular when there is no load or there is little load connected.

SUMMARY

Modes of implementation and embodiments of the invention relate to universal serial bus (USB) devices, in particular embodiments to universal serial bus devices that are compatible with the USB 3.1 standard, commonly known to those skilled in the art under the name Type-C, and more particularly to the compensation of voltage drops on USB Type-C cables linking two USB Type-C devices. In this context, a USB Type-C device is any device compliant with a USB Type-C standard in effect at the time of the initial filing of this patent. The same applies to other standards mentioned herein.

According to one mode of implementation and embodiment, a technical solution of low complexity that enables a rapid compensation of the voltage drop on a USB Type-C cable and that has little influence on the area of the implementation on silicon and on power consumption, without requiring an analog-to-digital converter or a finite state machine.

According to one aspect, a method can compensate for voltage drop on a USB Type-C cable connected between a USB Type-C source device and a USB Type-C receiver device. This method includes a phase of detecting the connection of the cable, including delivery, by the source device, on a channel configuration pin of the source device, of an offset current so as to increase the voltage on the channel configuration pin of the source device to a chosen reference voltage, and storage of this offset current in the source device. A charging phase, at the end of the detection phase, includes absorption, by the source device, of an absorption current originating from the channel configuration pin of the source device, the absorption current depending on the stored offset current and on the voltage drop, and generation, by the source device, on a power supply pin of the source device, of a compensated supply voltage equal to a reference supply voltage increased by the voltage drop to within a tolerance.

Such a method advantageously makes it possible to generate the compensated supply voltage by regulating the voltage on a channel configuration pin (commonly known to those skilled in the art under the acronym 'CC', which stands for Configuration Channel) of the source device, instead of directly detecting the voltage drop on the cable.

Advantageously, such a method is initiated only in a detection phase when a USB Type-C cable is connected. The regulation of the voltage on the channel configuration pin of the source device is carried out in the detection phase, that is to say in a period of the order of 100 to 150 ms from the connection of the cable.

The generation of the compensated supply voltage is carried out only in the phase of charging the USB Type-C receiver device. This consequently leads to a very small influence on the power consumption of the USB Type-C source device.

The chosen reference voltage may be selected for example from a set of reference values defined by the USB 3.1 Type-C standard and from a tolerance.

Specifically, the USB 3.1 Type-C standard provides for an informative current to flow continuously through the channel configuration pin of the source device, so as to indicate the maximum current able to be delivered by the USB Type-C source device.

By way of example, if the source device is capable of supplying a current of up to 3 A, an informative current of 330 µA is delivered to the channel configuration pin of the source device.

The USB Type-C receiver device receives this informative current through a pull-down resistor with a resistance of 5.1 kOhms+/−10%.

By way of indication, the estimated voltage on the channel configuration pin of the source device may vary between 1.44 V and 1.94 V if a tolerance of 5% for the informative current and a tolerance of 10% for the pull-down resistor of the receiver device are taken into consideration.

It should be noted that the admissible voltage range for the detection of such a cable is between 1.31 V and 2.04 V as defined in the USB 3.1 Type-C standard. In other words, if the voltage present at the channel configuration pin of the USB Type-C source device is within this range, a USB Type-C receiver device is deemed to be detected.

As a margin exists between the estimated maximum voltage, i.e., 1.94 V, taking into consideration the tolerances for the informative current and for the pull-down resistor, and the permitted maximum voltage, i.e., 2.04 V as defined in the USB 3.1 standard, it is possible to increase the voltage present at the channel configuration pin of the source device to the permitted maximum voltage, i.e., 2.04 V. Of course, it will also be possible to increase the current voltage to another voltage, for example between 1.94 V and 2.04 V.

According to one mode of implementation, the offset current is obtained incrementally from a sum of at least one stepped current and one subsidiary current whose value is lower than that of the at least one stepped current.

According to another mode of implementation, generating the compensated supply voltage includes generation, by the source device, from the absorption current, of a compensation current flowing through a compensation resistor so as to obtain the voltage drop, and summing of the voltage drop and the reference supply voltage.

The values of the absorption current and of the compensation current may for example be equal.

According to yet another mode of implementation, the value of the compensation resistor is twice as great as that of a pull-down resistor of the receiver device.

The tolerance may for example be equal to the compensation resistance multiplied by the subsidiary current.

According to another aspect, an electronic circuit for a USB Type-C source device can be used for compensating a voltage drop on a USB Type-C cable connected between the source device and a USB Type-C receiver device. The circuit comprises a regulator configured to deliver, in a phase of detecting the connection of the cable, on a channel configuration pin of the source device, an offset current so as to increase the voltage on the channel configuration pin of the source device to a chosen reference voltage and store this offset current. A processor configured to absorb, in a charging phase at the end of the detection phase, an absorption current originating from the channel configuration pin of the source device, the absorption current depending on the stored offset current and on the voltage drop, and to generate, on a power supply pin of the source device, a compensated supply voltage equal to a reference supply voltage increased by the voltage drop to within a tolerance.

Such an electronic circuit for compensating the voltage drop on the cable does not comprise any analog-to-digital converter, nor a finite state machine. This advantageously leads not only to a reduction in the power consumption of the electronic circuit, but also to a reduction in the area taken up on silicon.

By way of non-limiting example, the chosen reference voltage is selected from a set of reference values defined by the USB 3.1 Type-C standard and from a tolerance.

According to one embodiment, the regulator is configured to obtain the offset current from a sum of at least one stepped current and one subsidiary current whose value is lower than that of the at least one stepped current.

According to another embodiment, the regulator comprises a regulation stage that includes a reference voltage source configured to generate the chosen reference voltage, and an error amplifier receiving the chosen reference voltage and configured to increase the voltage on the channel configuration pin of the source device to the chosen reference voltage, An output stage includes at least N output modules coupled in parallel between the error amplifier and the channel configuration pin of the source device and each capable of delivering, to the channel configuration pin of the source device, a stepped current or a subsidiary current whose value is lower than that of the stepped current. The sum of N stepped currents being greater than or equal to the offset current.

According to yet another embodiment, the processor comprises a switching stage configured to be in the off state in the detection phase and to be in the on state in the charging phase, an absorption stage coupled to the switching stage and configured to absorb the absorption current, and a compensation stage coupled to the absorption stage and configured to generate, from the absorption current, the compensation current flowing through a compensation resistor and to generate, on the power supply pin of the source device, the compensated supply voltage.

According to yet another embodiment, the absorption stage and the compensation stage each include a programmable current source configured to limit the absorption current.

By way of non-limiting indication, the absorption stage and the compensation stage may for example be configured to render the values of the absorption current and of the compensation current equal.

According to another embodiment, the value of the compensation resistor is twice as great as that of a pull-down resistor of the receiver device.

The tolerance may for example be equal to the compensation resistance multiplied by the subsidiary current.

The electronic circuit may for example be formed in an integrated manner.

According to another aspect, what is proposed is a USB Type-C pin controller comprising the circuit as defined above.

According to another aspect, what is proposed is a USB Type-C source device comprising at least one controller as defined above.

According to yet another aspect, what is proposed is an electronic appliance, such as a cellular mobile telephone, tablet or laptop computer, comprising at least one device as defined above.

DETAILED DESCRIPTION OF ILLUSTRATIVE EMBODIMENTS

Figure 1:
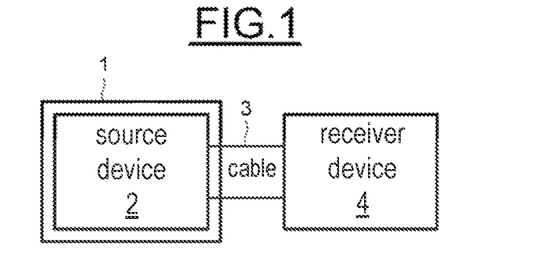
FIGS. 1 to 10 schematically illustrate modes of implementation and embodiments of the invention.

FIG. 1 illustrates an electronic appliance 1, in this case for example a desktop or laptop computer 1, including at least one USB Type-C source device 2 capable of charging, via a USB Type-C cable 3, a USB Type-C receiver device 4, in this case a cellular mobile telephone, for example.

For the sake of simplicity, only one source device 2 of the electronic appliance 1 is shown here.

Figure 2:
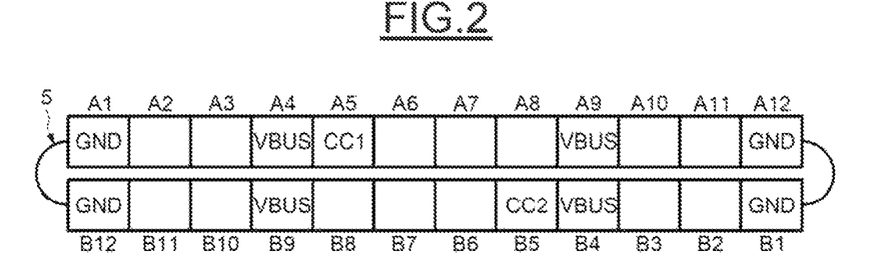

The source device 2 and the receiver device 4 each comprise a connector 5 of female type, including two channel configuration pins CC1 and CC2, four supply voltage pins VBUS and four ground pins GND, as illustrated in FIG. 2.

As defined in the USB 3.1 Type-C standard, all of the pins of identical type described above are symmetrical about the center of the connector 5, such that the connector 5 does not have a plug-in direction.

The USB Type-C cable 3 includes two cable connectors 6 of male type (FIG. 3), each containing a channel configuration pin CC of the cable 3 designed to be coupled to one of the two channel configuration pins CC1 or CC2 of the source device 2 or of the receiver device 4, four power supply pins VBUS and four ground pins GND.

Figure 3:
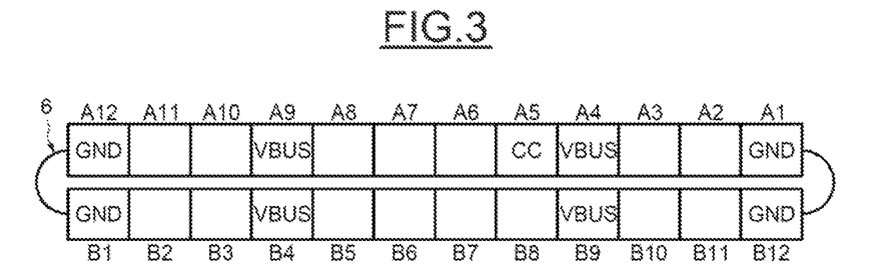

These supply voltage pins VBUS and ground pins GND are linked respectively to the corresponding pins of the source device 2 and receiver device 4 when the source device 2 and the receiver device 4 are linked via the cable 3.

Figure 4:
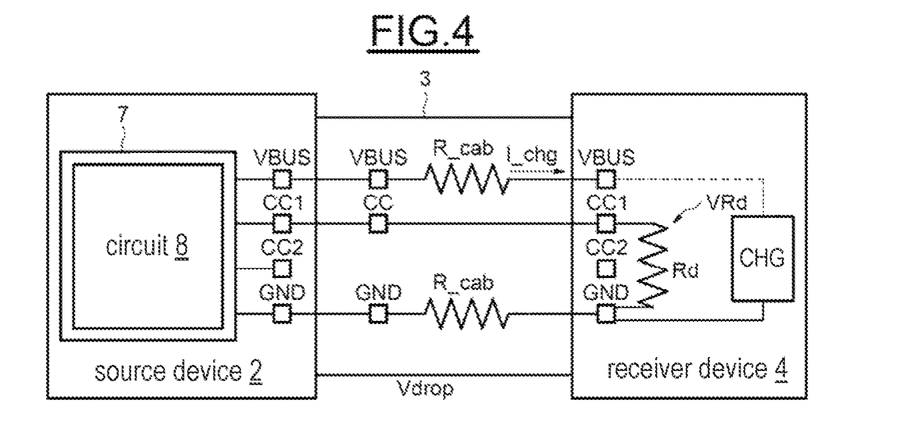

Reference is now made to FIG. 4 in order to illustrate, highly schematically, an example of coupling between the source device 2 and the receiver device 4 via the cable 3.

The source device 2 in this case includes a USB Type-C pin controller 7 coupled respectively to the pins VBUS, CC1, CC2, and GND of the source device 2.

The receiver device 4 includes in this case a pull-down resistor Rd coupled between a channel configuration pin, in this case for example a pin CC1 and a ground pin GND, and a load CHG, for example a battery to be charged, coupled between a supply voltage pin VBUS and the around pin GND.

The pins VBUS, CC, GND of the cable 3 are respectively coupled to the corresponding pins of the source device 2 and of the receiver device 4. The pins CC of the cable 3 are for example respectively coupled to the pin CC1 of the source device 2 and to the pin CC2 of the receiver device 4.

Moreover, the cable 3 has a cable resistance R_cab between its pins VBUS and another cable resistance R_cab between its pins GND, as illustrated in FIG. 4.

When the connection is established between the source device 2 and the receiver device 4 via the cable 3 and the source device 2 begins to charge the receiver device 4, a reference supply voltage Vbus_ref is delivered to the pin VBUS of the source device 2. A charging current I_chg flows between the power supply pins VBUS of the source device 2 and of the receiver device 4 through the cable resistance R_cab.

In order to compensate a voltage drop Vdrop on the cable 3 caused by the presence of the cable resistances R_cab, the controller 7 furthermore includes an electronic circuit 8 provided for this purpose.

Figure 5:
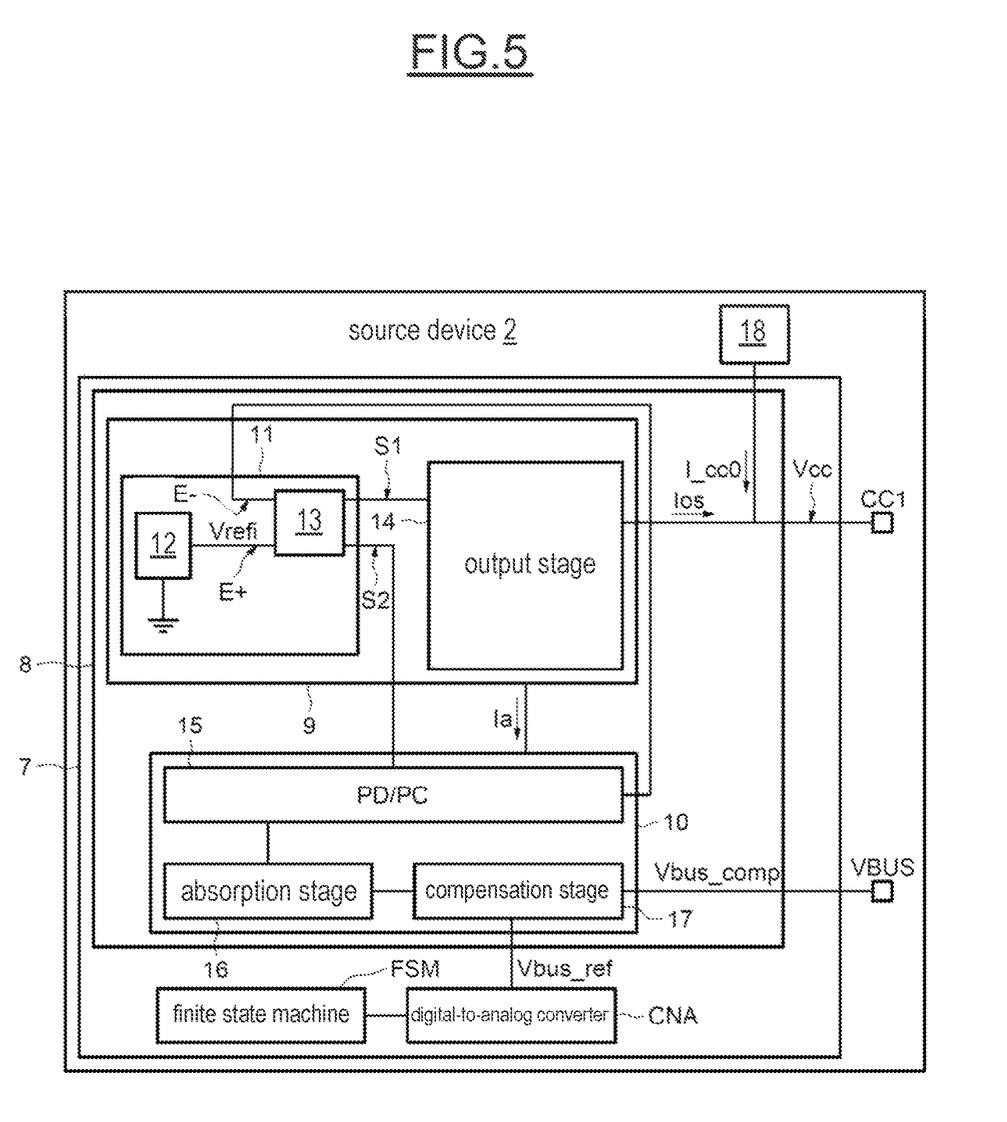

According to one embodiment, the circuit 8 comprises a regulator 9 and a processor 10, as illustrated in FIG. 5.

In a phase PD of detecting the connection of the cable 3, the regulator 9 is configured to deliver, on the channel configuration pin CC1 of the source device 2, an offset current Ios. In this way, the voltage Vcc on the pin CC1 increases to a chosen reference voltage Vrefi.

The regulator 9 is furthermore configured to store this offset current Ios.

In a charging phase PC at the end of the detection phase PD, the processor 10 is configured to absorb an absorption current Ia originating from the channel configuration pin CC1 of the source device 2. The absorption current Ia depends on the stored offset current Ios and on the voltage drop Vdrop.

The processor 10 is furthermore configured to generate, on a power supply pin VBUS of the source device 2, a compensated supply voltage Vbus_comp equal to a reference supply voltage Vbus_ref increased by the voltage drop Vdrop to within a tolerance.

A more detailed description will now be given, still with reference to FIG. 5, of an example of the internal structure of the electronic circuit 8 incorporated into the source device 2.

The regulator 9 is coupled to the channel configuration pins CC1 and CC2, in this case for example the pin CC1, and comprise a regulation stage 11 including a reference voltage source 12, an error amplifier 13 and an output stage 14.

The reference voltage source 12 is coupled to ground GND and configured to supply the chosen reference voltage Vrefi.

The error amplifier 13 has a positive input E+ coupled to the reference voltage source 12, a negative input E− coupled to the pin CC1 of the source device 2, a first output S1 coupled to the input of the output stage 14, and a second output S2 coupled to the processor 10.

The output stage 14 has an output coupled to the pin CC1 of the source device 2.

The output stage 14 is configured to deliver, on the pin CC1, the offset current Ios so as to increase the voltage Vcc on the pin CC1 to the reference voltage Vrefi and to store this offset current Ios.

It should be noted that the voltage Vrefi is chosen taking into consideration one of the nominal currents defined by the USB 3.1 Type-C standard (500 mA, 1.5 A and 3 A), and tolerances on the current source and the pull-down resistor Rd of the receiver device 4. In other words, this voltage Vrefi is between the maximum estimated depending on the implementation and the maximum permitted by the USB 3.1 Type-C standard.

The processor 10 is coupled to the regulator 9 and is intended to deliver, to the pin VBUS of the source device 2, the compensated supply voltage Vbus_comp compensating the voltage drop Vdrop on the cable 3.

The processor 10 includes a switching stage 15, an absorption stage 16 and a compensation stage 17.

The switching stage 15 is coupled between the second output S2 of the error amplifier 13 and the absorption stage 16, and is intended to render the processor 10 operational only in the charging phase PC at the end of the phase PD of detecting the connection of the cable 3.

The absorption stage 16 is coupled between the switching stage 15 and the compensation stage 17, and is configured to absorb the absorption current Ia originating from the pin CC1.

The compensation stage 17 is intended to receive the reference supply voltage Vbus_ref delivered by a digital finite state machine FSM of the controller 7 via a digital-to-analog converter CNA of the controller 7, and is configured to transform the absorption current Ia into a compensation current Icomp and to generate the compensated supply voltage Vbus_comp to be equal to the sum of a voltage drop Vdrop on the cable 3 and the reference supply voltage Vbus_ref.

It should be noted that the machine FSM and the converter CNA mentioned above are generally used in conventional USB Type-C controllers.

Moreover, as defined in the USB 3.1 standard, and as illustrated in FIG. 5, the source device 2 furthermore includes a current source 18 configured to deliver an informative current I_cco on the pin CC1 so as to inform the receiver device 4, connected via the cable 3, of the current power supply capability of the source device 2 on the pin VBUS.

By way of example, if the informative current I_cco is of the order of 330 μA, that signifies that the source device 2 is capable of supplying a maximum current of 3 A.

This informative current I_cco is recovered within the receiver device 4 (FIG. 4) through the resistor Rd, and the value of the maximum current supplied by the source device 2 is determined via the voltage VRd (FIG. 4) applied across the resistor Rd.

Figure 6:
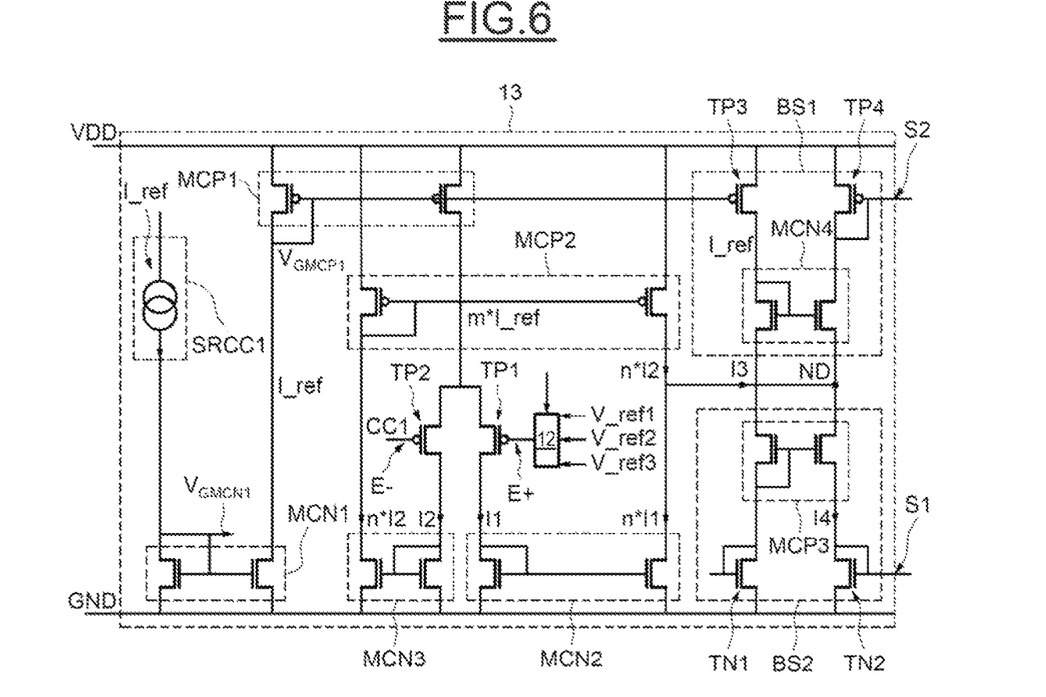

Reference is now made to FIG. 6 in order to illustrate in more detail an exemplary embodiment of the error amplifier 13 of the regulation stage 9.

The error amplifier 13 includes a differential pair of MOS transistors TP1 and TP2.

The gate of the transistor TP1 forms the positive input E+ of the error amplifier 13, and is coupled to the reference voltage source 12 described below. It is possible for example to choose the reference voltage from the three reference voltages V_ref1, V_ref2, V_ref3 between 0.2 V and 2.04 V, which reference voltages may be respectively equal to 0.5 V, 1.1 V and 2 V, for example.

The gate of the transistor TP2 forms the negative input E− of the error amplifier 13 and is coupled to the channel configuration pin CC1 of the source device 2 in such a way as to retroactively receive the voltage present at the pin CC1.

The error amplifier 13 also includes a first current source SRCC1, known per se and configured to supply a current I_ref. A first current mirror MCN1 of NMOS type is coupled to the first current source SRCC1 and configured to reproduce the current I_ref. A first current mirror MCP1 of PMOS type is coupled to the first current mirror MCN1 of NMOS type and to the differential pair TP1 and TP2 and is configured to have a current transfer ratio m and to bias the differential pair TP1 and TP2 with a current m*I_ref. A second current mirror MCP2 of PMOS type is coupled respectively to a second and to a third current mirror MCN2 and MCN3 of NMOS type, these being themselves coupled respectively to the drain of the transistors TP1 and TP2. A first output block BS1 is coupled to the second output S2 intended to be coupled to the processor 10. A second output block BS2 is coupled to the first output module MS1 and to the first output S1 intended to be coupled to the output stage 14.

The first output module MS1 and the second output block BS2 are respectively coupled to the first and second current mirrors MCP1 and MCP2 of PMOS type.

By applying a reference voltage Vrefi (i=1, 2 or 3) to the gate of the transistor TP1 and the current voltage at the pin CC1 of the source device 2 to the gate of the transistor TP2, we obtain a first current I1 flowing through the transistor TP1 and a second current I2 flowing through the transistor TP2.

Due to the presence of the first current mirror MCP1, the sum of the first and second currents I1 and I2 is equal to m*I_ref.

By analogy, due to the presence of the second current mirror MCP2 of PMOS type having a current transfer ratio equal to 1 and of the second and third current mirrors MCN2 and MCN3 of NMOS type each having a current transfer ratio n, the difference ΔI between the first and second currents I1 and I2 generates a third current I3 equal to n*(I2−I1)=n*ΔI and flowing, when the second current I2 is greater than the first current I1, to a node ND between the first and second output blocks BS1 and B52, or, when the first current I1 is greater than the second current I2, from the node ND.

The first output block BS1 comprises a fourth current mirror MCN4 of NMOS type, coupled to the supply voltage VDD via a third PMOS transistor TP3 whose gate is coupled to the gate of the transistors of the first current mirror MCP1 of PMOS type, and to a fourth transistor TP4 of PMOS type whose gate is coupled to its source and to the second output S2.

The second output block BS2 comprises a third current mirror MCP3 of PMOS type coupled to ground GND via a first transistor TN1 of NMOS type whose gate and drain are coupled to one another, and to a second transistor TN2 of NMOS type whose gate is coupled to its drain and to the first output S1.

It should be noted that the third and fourth current mirrors MCP3 and MCN4 are configured to bias the second transistor TN2, and the transfer ratios m and n are chosen depending on the value of the reference current I_ref so as to generate a fourth current I4 flowing through the second transistor TN2 and equal to the current n*ΔI.

Figure 7:
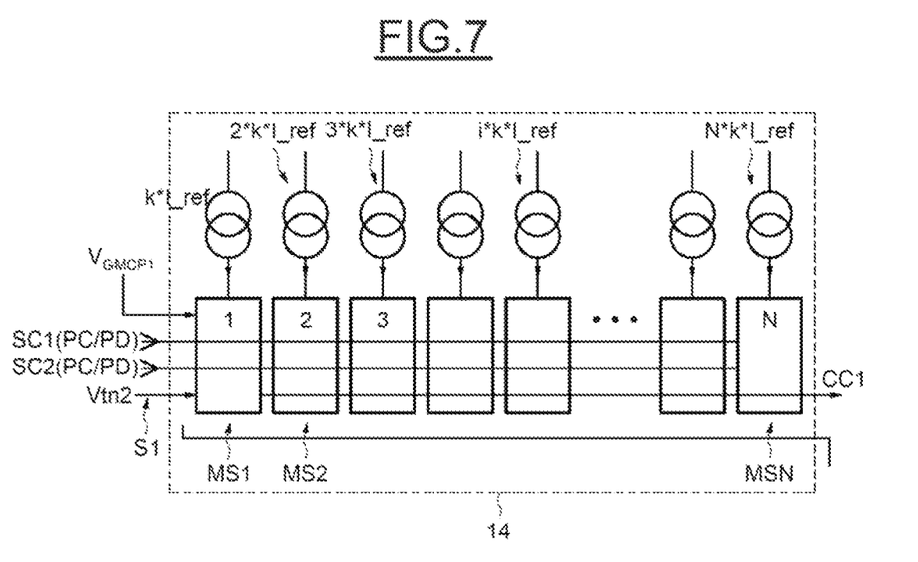
Figure 8:
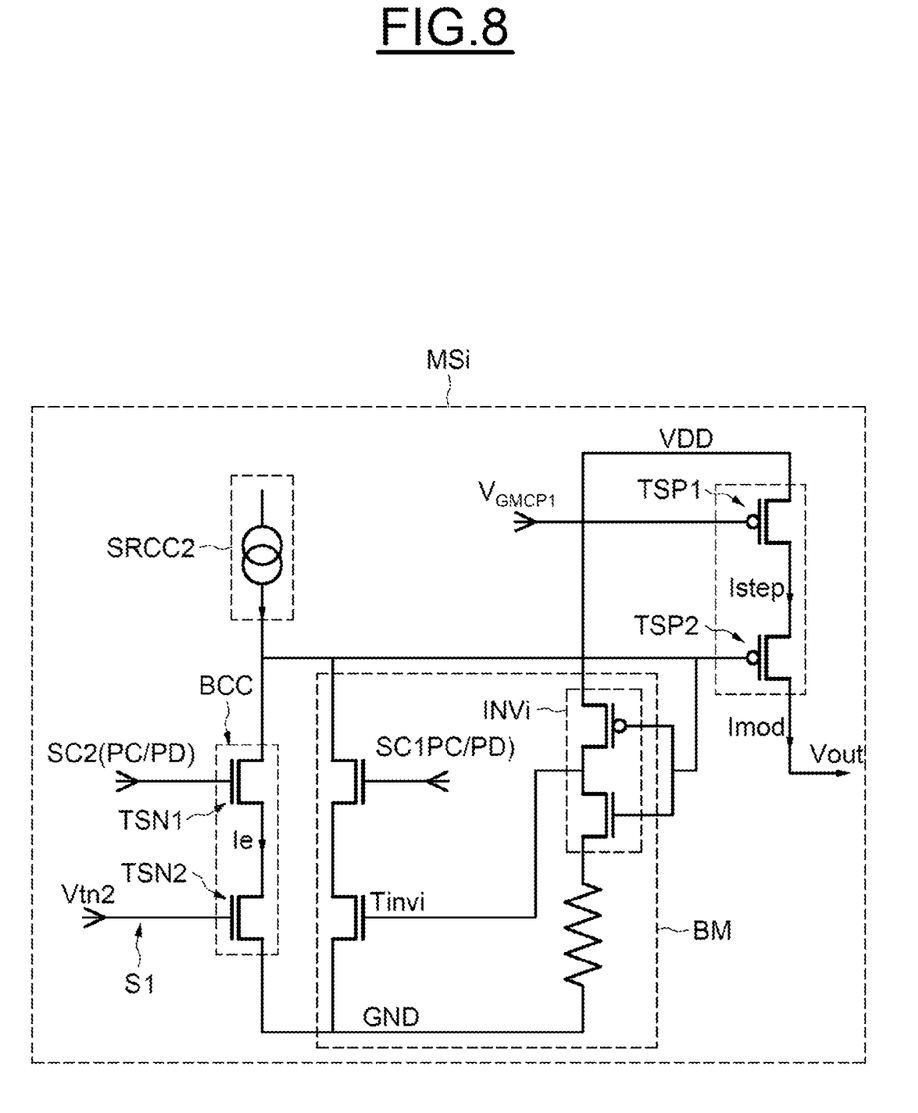

Reference is now made to FIGS. 7 and 8 in order to schematically illustrate an exemplary embodiment of the output stage 14.

N output modules MSi are coupled in parallel between the first output S1 of the error amplifier 13 and the pin CC1 of the source device 2.

Each output module MSi receives the voltage VGMCP1 applied to the gates of the PMOS transistors of the first current mirror MCP1, a first control signal SC1, a second control signal SC2 whose value is complementary to that of the first control signal SC1, and the voltage Vtn2 applied to the gate of the second transistor TN2 of NMOS type.

It should be noted that, in the detection phase PD, the first control signal SC1 is in the low state and the second control signal SC2 is in the high state, whereas, in the charging phase PC, the first control signal SC1 is in the high state and the second control signal SC2 is in the low state.

Each output module MSi is capable of delivering, at its output, a maximum current equal to a stepped current Istep.

In order to ensure that the compensation current Ios delivered at the output of the output stage 14 is large enough to increase the voltage Vcc on the pin CC1 of the source device 2, via the cable 3, to the chosen reference voltage Vrefi, the number N of output modules must satisfy the following relationship:

$$Rd*(I\_cco+N*Istep) \geq Vrefi = I\_cco*Rd + Ios*Rd$$

It is therefore possible to deduce therefrom that N must satisfy the relationship:

$$N*Istep \geq Ios$$

FIG. 8 schematically illustrates an exemplary embodiment of an output module MSi of the output stage 14.

The output module MSi includes a current comparator block BCC comprising a first output transistor TSN1 and a second output transistor TSN2, of NMOS type, which are coupled in series between a second current source SRCC2 delivering a reference current equal to i*k*I_ref, where i is an integer between 1 and N and k∈[0,1].

The gate of the first transistor TSN1 is intended to receive the second control signal SC2 and the gate of the second transistor TSN2 is coupled to the gate of the second transistor TN2 so as to form a current mirror of NMOS type.

During the detection phase PD, the second control signal SC2 is in the high state and an input current Ie flows through the second transistor TSN2.

The output module MSi furthermore includes a modulation block BMOD comprising a first output transistor TSP1 and a second output transistor TSP2, of PMOS type, which are coupled in series between the supply voltage VDD and the output SMS of the output module MSi.

The gate of the first transistor TSP1 is coupled to the voltage VGMCP1 and the gate of the second transistor TSP2 is coupled to the drain of the first transistor TSN1.

When I4>>i*k*I_ref, the current Ie is equal to the corresponding reference current i*k*I_ref, and the gate of the second transistor TSP2 is linked to ground GND via the first and second transistors TSN1 and TSN2.

As a result, the second transistor TSP2 is in the on state so as to deliver a modulation current Imod equal to the stepped current Istep.

When I4<<i*k*I_ref, the current Ie is equal to the current I4. In this case, the gate of the second transistor TSP2 is at the voltage VDD and delivers a zero current.

When I4 is close to i*k*I_ref, that is to say I4=i*k*I_ref±ε, the second transistor TSP2 becomes a gain stage and delivers a subsidiary current Is greater than zero but less than the stepped current Istep. This operating zone corresponds to the modulation of the current delivered by the second current source SRCC2 depending on the voltage across its terminals.

It should be noted that all of the modulation currents Imod and subsidiary currents Is are delivered to the pin CC1 so as to increase the voltage at the pin CC1 to the chosen reference voltage Vrefi.

As indicated above, the current I4 is proportional to the current $n*\Delta I$ when the voltage Vcc2 on the pin CC1 is not equal to the chosen reference voltage Vrefi and the input current Ie is controlled by the current I4.

In a case where (p+1)*I_ref>I4>p*I_ref, p being the number of active modules when the loop regulates. As a result, p output modules MS1 to MSp are activated in order to deliver a current Istep, the (p+1)th output module MS(p+1) delivers a subsidiary current Is so that Ios=p*Istep+Is, and the modules MS(p+2), MS(p+3), . . . MS(N) deliver a zero current.

Each output module MSi furthermore comprises a storage block BM including a conventional inverter INVi coupled between the voltage VDD and ground GND via an inverting transistor Tinvi.

When the first control signal SC1 is in the low state, the circuit 8 operates in the detection phase PD, and p+1 output modules MS1 to MS(p+1) are activated. The state of the gate of the transistor TSP2 of each of the N output modules MSi is stored by the corresponding storage block BM.

When the first control signal SC1 is in the high state, the circuit 8 operates in the charging phase PC, and the current comparator block BCC is in the off state. The gate of the second transistor TSP2 is coupled to ground GND via the storage block BM.

The output stage 14 delivers, in the charging phase PC, through the p output modules MS1 to MSp that have already been activated in the detection phase PD, a current p*Istep on the pin CC1 of the source device 2.

Figure 9:
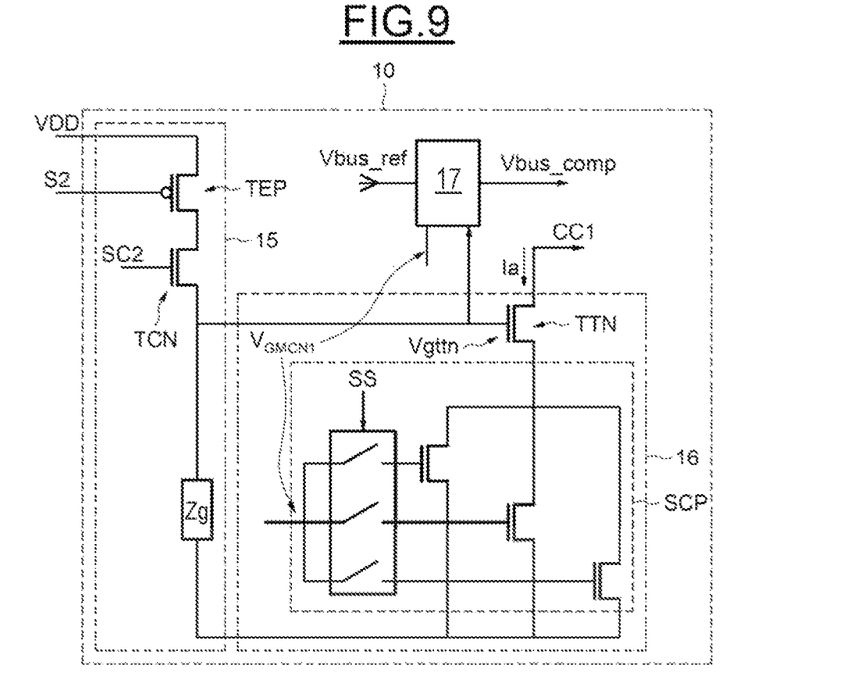

Reference is now made to FIG. 9 in order to schematically illustrate in more detail an exemplary embodiment of the processor 10.

The switching stage 15 of the processor 10 includes in this case, for example, an input transistor TEP of PMOS type whose gate is coupled to the second output S2 (FIG. 6), a switching transistor TCN of NMOS type, and a gain impedance Zg, which is coupled in series between the voltage VDD and ground GND.

The gate of the switching transistor TCN is controlled by the second control signal SC2. When the second control signal SC2 is in the low state, the circuit 8 is in the charging phase PC, and the switching stage 15 is in the on state.

In this case, the transistor TEP and the impedance Zg operate as a common-source gain stage controlled by the second control signal SC2.

The absorption stage 16 comprises a pull transistor TTN of NMOS type and a programmable current source SCP.

The gate of the transistor TTN is coupled between the switching transistor TCN and the impedance Zg, the drain is coupled to the pin CC1 of the source device 2, and the source is coupled to the programmable current source SCP.

This source is controlled by the voltage VGMCN1 applied to the gates of the transistors of the first current mirror MCN1.

The programmable current source SCP includes for example three transistors of NMOS type coupled in parallel between the source of the transistor TTN and ground GND, and a conventional selection block supplied with the voltage VGMCN1 and controlled by a selection signal SS.

The transistor TTN is configured to absorb an absorption current Ia ('sinking current') originating from the pin CC1 of the source device 2, and the programmable current source SCP is configured to limit the amplitude of this absorption current Ia so as to avoid possible overcompensation, for example in the case of a damaged cable.

On account of this, in the charging phase PC, the current Icc flowing through the pull-down resistor Rd via the pin CC2 of the receiver device 4 is equal to:

$$Icc=I\_cco+p*Istep-Ia$$

The regulator 9 imposes, in the detection phase PD, the chosen reference voltage Vrefi on the pin CC1 of the source device 2.

The voltage present at the pin CC1 of the source device 2 is therefore:

$$Vcc=Vrefi=VRd+R\_cab*I\_chg$$

where I_chg represents the current flowing through the load CHG of the receiver device 4 as illustrated in FIG. 4.

We have $$VRd=Rd*Icc=Rd*(Icco+p*Istep-Ia); \text{ and}$$

$$Rd*(Icco+p*Istep)=Vrefi-Rd*Is$$

It is therefore possible to deduce therefrom that:

$$Ia=R\_cab*I\_chg/Rd-Is.$$

The compensation stage 17 receives, at its inputs, the gate voltage Vgttn of the pull transistor TTN, the voltage VGMCN1 and the reference supply voltage Vbus_ref, and is configured to transform the absorption current Ia into a compensation current Icomp and to generate a compensated supply voltage Vbus_comp depending on the compensation current Icomp and on the reference supply voltage Vbus_ref.

Figure 10:
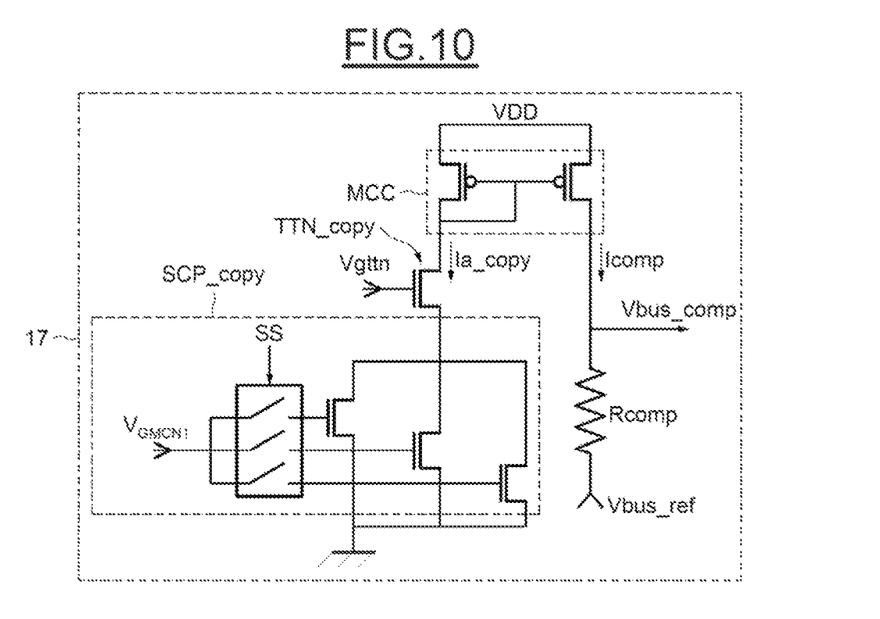

Reference is now made to FIG. 10 in order to schematically illustrate in more detail an exemplary embodiment of the compensation stage 17.

Within the compensation stage 17 are a pull transistor TTN_copy and a programmable current source SCP_copy identical to that of the absorption stage 16.

The transistor TTN_copy is identical to that of the absorption stage 16. Its source is coupled to the programmable current source SCP_copy, and its gate is coupled to the gate voltage Vgttn. The current Ia_copy flowing through the pull transistor TTN_copy is therefore equal to the absorption current Ia.

The compensation stage 17 furthermore includes a compensation current mirror MCC that is known per se and configured to generate a compensation current Icomp having the same amplitude as the absorption current Ia and an opposing direction.

By receiving the voltage Vbus_ref originating from the digital-to-analog converter CNA (FIG. 5) of the source device 2, the compensation current Icomp flows through a compensation resistor Rcomp.

On account of this, the compensated supply voltage Vbus_comp is equal to the sum of the reference supply voltage Vbus_ref and the voltage Vcomp flowing through the compensation resistor Rcomp.

We therefore have $V\text{bus\_comp}=V\text{bus\_ref}+R\text{comp}*I\text{comp}$ As the current Icomp is equal to the absorption current Ia $Ia=R\_\text{cab}*I\_\text{chg}/Rd-Is,$ it is therefore possible to obtain $V\text{bus\_comp}=V\text{bus\_ref}+R\text{comp}*(R\_\text{cab}*I\_\text{chg})/Rd-R\text{comp}*Is.$ If Rcomp*Is≤10 mV, this term may be disregarded and deemed to be a tolerance.

We therefore obtain:

$V\text{bus\_comp}=V\text{bus\_ref}+R\text{comp}*(R\_\text{cab}*I\_\text{chg})/Rd.$ Knowing that the voltage drop Vdrop on the cable 3 is equal to:

$V\text{drop}=2*R\_\text{cab}*I\_\text{chg},$

We then obtain $V\text{bus\_comp}=V\text{bus\_ref}+R\text{comp}*V\text{drop}/(2*Rd).$ In the case where the value of the resistor Rcomp is configured to be equal to twice the resistance Rd, here for example Rcomp=2*5.1 kOhm, the voltage drop Vdrop on the cable 3 is compensated in the new compensated supply voltage Vbus_comp to within a tolerance, namely Rcomp*Is.

What is claimed is:

1. A method for compensating a voltage drop on a cable connected between a source device and a receiver device, the method comprising:
   increasing, by the source device, a voltage on a channel configuration pin of the source device to a chosen reference voltage by increasing an offset current on the channel configuration pin of the source device;
   storing the offset current in the source device as a stored offset current after increasing the voltage to the chosen reference voltage;
   absorbing, by the source device, an absorption current originating from the channel configuration pin of the source device, the absorption current depending on the stored offset current and on the voltage drop; and
   generating, by the source device, a compensated supply voltage on a power supply pin of the source device, the compensated supply voltage equal to a reference supply voltage increased by the voltage drop to within a first tolerance.

2. The method according to claim 1, wherein the cable is a USB Type-C cable, the source device is a USB Type-C source device and the receiver device is a USB Type-C receiver device.

3. The method according to claim 2, wherein the chosen reference voltage is selected from a set of reference values defined by a USB 3.1 Type-C standard and from a second tolerance.

4. The method according to claim 1, wherein the offset current is obtained incrementally from a summation of a subsidiary current and at least one stepped current, wherein a value of the subsidiary current is lower than a value of the at least one stepped current.

5. The method according to claim 4, wherein the first tolerance is equal to a compensation resistance multiplied by the subsidiary current.

6. The method according to claim 1, wherein generating the compensated supply voltage comprises:
   generating, by the source device, a compensation current from the absorption current, the compensation current flowing through a compensation resistor so as to obtain the voltage drop; and
   summing the voltage drop and the reference supply voltage.

7. The method according to claim 6, wherein a value of the absorption current and a value of the compensation current are equal.

8. The method according to claim 6, wherein a resistance value of the compensation resistor is twice as great as a resistance value of a pull-down resistor of the receiver device.

9. An electronic circuit for a source device for compensating a voltage drop on a cable connected between the source device and a receiver device, the electronic circuit comprising:
   a regulator configured to
      increase a voltage on a channel configuration pin of the source device to a chosen reference voltage by increasing an offset current on the channel configuration pin of the source device in a detection phase of detecting connection of the cable, and
      store the offset current as a stored offset current after increasing the voltage to the chosen reference voltage; and
   a processor configured to
      absorb, in a charging phase after the detection phase, an absorption current originating from the channel configuration pin of the source device, the absorption current depending on the stored offset current and on the voltage drop, and
      generate, on a power supply pin of the source device, a compensated supply voltage equal to a reference supply voltage increased by the voltage drop to within a first tolerance.

10. The electronic circuit according to claim 9, wherein the electronic circuit is for a USB Type-C source device.

11. The electronic circuit according to claim 9, wherein the chosen reference voltage is selected from a set of reference values defined by a USB 3.1 Type-C standard and from a second tolerance.

12. The electronic circuit according to claim 9, wherein the regulator is configured to obtain the offset current from a summation of a subsidiary current and at least one stepped current, wherein a value of the subsidiary current is lower than a value of the at least one stepped current.

13. The electronic circuit according to claim 12, wherein the first tolerance is equal to a compensation resistance multiplied by the subsidiary current.

14. The electronic circuit according to claim 12, wherein the regulator comprises:
   a regulation stage including a reference voltage source configured to generate the chosen reference voltage, and an error amplifier coupled to receive the chosen reference voltage and configured to increase the voltage on the channel configuration pin of the source device to the chosen reference voltage, and
   an output stage including a plurality of output modules coupled in parallel between the error amplifier and the channel configuration pin of the source device, each output module capable of delivering, to the channel configuration pin of the source device, the at least one stepped current or the subsidiary current that has the value that is lower than the value of the at least one stepped current, wherein a summation of the at least one stepped currents is greater than or equal to the value of the offset current.

15. The electronic circuit according to claim 9, wherein the processor comprises:
a switching stage configured to be in an off state in the detection phase and to be in an on state in the charging phase;
an absorption stage coupled to the switching stage and configured to absorb the absorption current; and
a compensation stage coupled to the absorption stage and configured to generate, from the absorption current, a compensation current flowing through a compensation resistor and to generate, on the power supply pin of the source device, the compensated supply voltage.

16. The electronic circuit according to claim 15, wherein the absorption stage and the compensation stage each include a programmable current source configured to limit the absorption current.

17. The electronic circuit according to claim 15, wherein the absorption stage and the compensation stage are configured to render a value of the absorption current equal to a value the compensation current.

18. The electronic circuit according to claim 15, wherein a resistance value of the compensation resistor is twice as great as a resistance value of a pull-down resistor of the receiver device.

19. The electronic circuit according to claim 9, wherein the regulator and the processor are integrated in a single chip.

20. A USB Type-C pin controller comprising:
a regulator configured to
increase a voltage on a channel configuration pin to a chosen reference voltage by increasing an offset current on the channel configuration pin in a detection phase of detecting connection of a cable, and
store the offset current as a stored offset current after increasing the voltage to the chosen reference voltage, wherein the chosen reference voltage is selected based on a set of reference values defined by a USB 3.1 Type-C standard; and
a processor configured to
absorb, in a charging phase after the detection phase, an absorption current originating from the channel configuration pin, the absorption current depending on the stored offset current and on a voltage drop of the cable, and
generate, on a power supply pin, a compensated supply voltage equal to a reference supply voltage increased by the voltage drop to within a tolerance.

* * * * *